Sept. 29, 1959 R. J. WYLDE 2,906,970

SYSTEM FOR PRODUCING AMPLITUDE-MODULATED SIGNALS

Filed Aug. 28, 1953 2 Sheets-Sheet 1

INVENTOR
RONALD J. WYLDE,

BY Miles D. Pillars

ATTORNEY

INVENTOR
RONALD J. WYLDE,

BY [signature]

ATTORNEY 2,906,970

SYSTEM FOR PRODUCING AMPLITUDE-MODULATED SIGNALS

Ronald J. Wylde, Washington, D.C.

Application August 28, 1953, Serial No. 377,211

5 Claims. (Cl. 332—31)

My invention relates to improved systems for producing useful signals from an amplitude-modulating device, and more particularly for producing, at a useful power or amplitude level, either a modulated carrier whose envelope conveys the original information introduced into the system by the amplitude-modulating device, or a demodulated output whose fluctuations are directly in proportion to the original information introduced by the amplitude-modulating device.

Further, my invention relates to improved systems for producing a plurality of such useful signals with a single power-consuming element. Another object of my invention relates to improved systems for producing, from certain types of amplitude-modulating devices, a useful output signal in which the desired information is conveyed by a harmonic of the carrier frequency which excites the amplitude-modulating device. In general, my invention is readily adaptable to a wide variety of applications in information-transmitting systems where the input information is introduced into the system by means of an amplitude-modulating element.

In systems where stability and freedom from noise are important, prior art systems of obtaining useful signals from an amplitude-modulating device have employed the following components in addition to the basic amplitude-modulating device:

(1) An oscillator to provide excitation for the amplitude-modulating device. This oscillator is a power consuming device; and, when low noise in the output signal is an important consideration, the oscillator must be carefully stabilized against amplitude or frequency variation or drift.

(2) An amplifier to produce sufficient power or voltage in the output signal for utilization by associated equipment, since, for many specific applications, the power or voltage levels handled by amplitude-modulating devices are of a low order. Furthermore, the amplifier must include means for frequency discrimination when low output noise is a critical requirement; and this means of frequency discrimination must be stabilized so that it does not drift, in frequency, with respect to the oscillator output.

(3) A demodulating means must be used in systems where an amplitude-modulated carrier is not the end product. For complete restoration of the original input information introduced by the amplitude-modulating device, reference must be made to the original excitation through use of a phase-sensitive or synchronous demodulator.

In view of the aforesaid complexities of the prior art, an object of my improved system is to provide greatly simplified means of producing signals of useful power or amplitude level from amplitude-modulating devices. The simplifications attendant on the use of my invention to replace prior art methods are broadly as follows:

(1) An oscillator, which must be frequency and amplitude stabilized in high-quality systems, is no longer needed to provide excitation for the amplitude-modulating device.

(2) The required characteristics of the single frequency-discriminating element used in my improved system are greatly simplified. In the improved system of my invention, frequency drift of the frequency-discriminating element has, in general, no effect on the system's operation; hence, this element does not have to be frequency stabilized.

(3) In general, the improved system produces amplitude-modulated signals free of spurious content with fewer and simpler components than are required in prior art systems.

Another object of my improved system is the provision for multiplexing of amplitude-modulated systems using only a single power-consuming component.

A still further object of my improved system is the provision of a simplified means of producing excitation for an amplitude-modulating device, using a harmonic of the exciting frequency to convey the modulating information. With certain types of amplitude-modulating devices, this use of a harmonic has distinct advantages in rejecting spurious signals.

Yet another object of my improved system is the provision for a simplified means of producing excitation for an amplitude-modulating device, amplifying the resultant signal, and demodulating it by means of a phase-sensitive demodulator.

Referring to the drawings.

Figure 1:
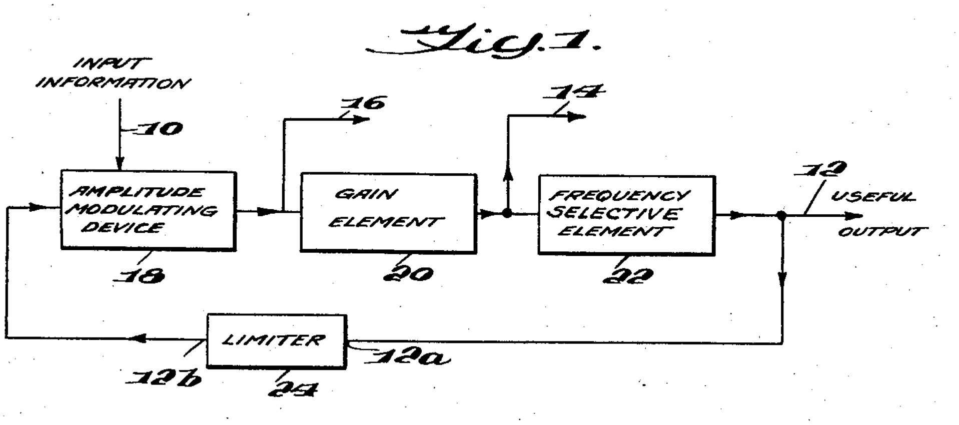
Fig. 1 is a general block diagram showing the general arrangement of components and the flow of signals.

While the invention is susceptible of various modifications and combinations of embodiments, I have shown in the drawings and will herein describe in detail the preferred embodiments. It will be understood, however, that I do not intend to limit the invention by such disclosures, for I aim to cover all modifications and combinations of embodiments falling within the spirit and scope of the invention as defined in the appended claims.

Referring to Fig. 1, it will be seen that my invention in its most simplified form comprises a closed loop system. At the position indicated by reference numeral 10, input information (whose source or nature forms no part of this invention) enters the system by effecting amplitude modulation of a carrier waveform. At point 12, substantially this same information, now conveyed by means of the envelope of an amplitude-modualted signal of useful power or amplitude level, leaves the system. Alternatively, the signal at either points 14 and 16 might be the useful output of the system. The closed loop is itself a regenerative feed back system in a condition of spontaneous oscillation. The necessary requirements for said condition are twofold: (*a*) the loop gain for the carrier frequency must be unity, and (*b*) the phase-shift around the loop must be zero for the carrier frequency. Four basic components are required to establish a spontaneously-oscillating, closed-loop system having the input-output characteristics above stated. These components are: an amplitude-modulating device, a gain element, a frequency-selective element, and a limiter. For expediency in design, certain of these components may be combined into a single element.

The amplitude-modulating device indicated by reference numeral 18 has input terminals to which is fed a constant level alternating voltage referred to as the carrier or exciting voltage, and terminals from which an output is taken. Within the amplitude-modulating device, by means not pertinent to this invention, some electrical, mechanical, optical, or other type of input information from an external source varies the amplitude of the carrier voltage such that the amplitude of the alternating voltage appearing at the output terminals of the amplitude-modulating device is a function of the input information from the aforementioned external source.

The gain element 20, typified by a conventional amplifier, provides for the controlled admission of sufficient power from an external source to balance the inevitable losses of power in components within the system, and also to drive the load connected to the outputs 12 or 14.

The frequency-selective element 22, of which band pass filters are illustrative, can be any means of effecting the aforementioned two-fold requirements for producing spontaneous loop oscillation at a selected frequency.

The limiter 24 has input terminals 12*a* to which an alternating voltage of varying amplitude is fed, and output terminals 12*b* at which a corresponding alternating voltage of constant, or nearly constant amplitude appears. In practice, an ideal limiter is unobtainable; but the operation of the invention is entirely satisfactory with conventional limiters known in the art.

Figure 2:
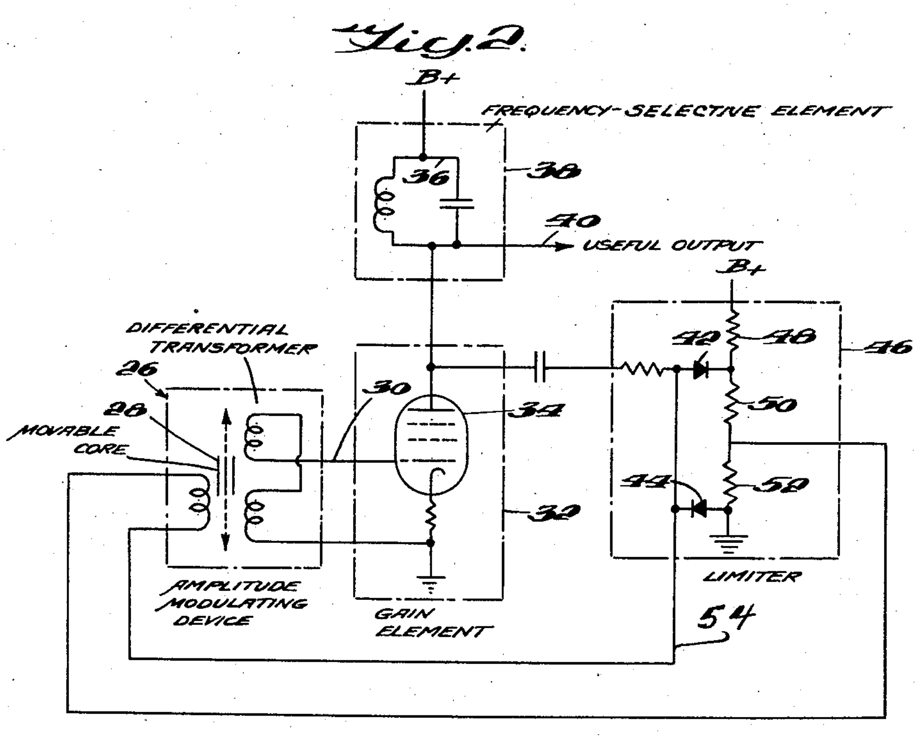
Fig. 2 is a detailed circuit diagram illustrating a typical embodiment.

In Fig. 2, the four above-discussed components utilized in my invention are shown as they might be physically realized in an electronic displacement-measuring device. The system of Fig. 2 is presented as illustrative of many possible circuits utilizing the fundamental principal of my invention. The amplitude-modulating device shown in Fig. 2 is a displacement-sensing differential transformer 26 in which the resting position of the movable core 28 is adjusted to be sufficiently removed from the null condition so that the displacements being measured never move the core to the zero-output condition. The zero-output condition must be avoided since the loop-gain for the carrier frequency must always be unity. The output 30 of the differential transformer 26 is fed into a gain element 32, which, for purposes of illustration, is shown as a high-gain pentode 34. A parallel resonant network 36 in the plate circuit of tube 34 forms a frequency-selective element 38. Sources of power needed for operation of the pentode are not shown since such details are well-known to those in the art. The output 40 of the pentode 34 is the useful output of the system, being an amplitude-modulated wave-form whose envelope conveys the desired displacement information. It should be noted that the amplifying pentode may be selected to have any specified power output so that, in practice, the output 40 may be utilized to drive any desired load. An arrangement of two semi-conductor diodes 42 and 44 in a clipping circuit 46 acts as the required limiter. Resistors 48, 50 and 52 are selected to provide the voltage levels and impedances needed for most effective limiting of the output signal voltage 40. The constant-amplitude output 54 of the limiter 46 is fed back to provide carrier frequency excitation for the differential transformer 26.

The overall stability of the displacement measuring system of Fig. 2 depends on the inherent stability in the design of the differential transformer 26 and also on certain features of the associated circuitry and components. These features are (*a*) the gain of the pentode stage and (*b*) the amplitude level of the limiter output. These requirements for stable gain and constant limiter output do not require complex design features, and are easily realized by those skilled in the art with conventional equipment.

The simplicity of the circuit shown in Fig. 2 should be contrasted with prior-art systems for obtaining useful signals from a differential-transformer displacement gage. In pror-art systems a separate, independent oscillator is used to provide carrier excitation for the differential transformer. Then, since differential transformers, in general, operate at low power levels, it is necessary to amplify the output to a useful power level. For best signal-to-noise ratio this amplification should be accomplished by a tuned amplifier whose centerband frequency is the same as the frequency of the oscillator exciting the differential transformer. As a consequence, stable operation of such a system demands negligible drift between the frequency-determining element in the oscillator and the frequency-selective network in the tuned amplifier.

An important advantage of my invention lies in the fact that a single frequency-selective element, such as the simple tuned circuit 38, serves simutaneously as a band-pass filter for the output of the gain element, and as the frequency determining element for the carrier waveform which serves to excite the ampiltude-modulating element.

Figure 3:
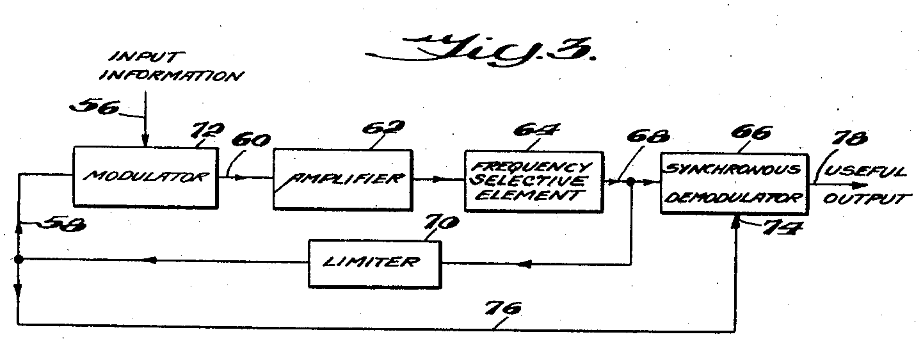
Fig. 3 is a block diagram showing an embodiment wherein the limiter output is used to effect phase-sensitive or synchronous demodulation.

The operation of the embodiment of my invention shown in Fig. 3 is based upon the underlying principles employed in the system of Fig. 1. In Fig. 3, just as in Fig. 1, some external source of input information enters the system at 56. This information amplitude modulates the carrier waveform 58, coming from the limiter. The low-level amplitude-modulated waveform 60 is amplified to a useful power or amplitude level by amplifier 62, passes through a frequency-selective element 64, and then enters a synchronous (or phase-sensitive) demodulator 66. This signal 68 also energizes the limiter 70 whose constant-amplitude output 58 provides the necessary carrier excitation for the amplitude-modulating device 72. However, the limiter output 58 also serves as the reference (or switching) signal for the synchronous demodulator 66, since it is connected to the reference voltage input 74 by conductor 76. A demodulator circuit, such for example, as that described in the Review of Scientific Instruments (vol. 22, No. 4, April 1951, pages 254–255) may be used, although other synchronous demodulator circuits serve equally well. The output 78 of the synchronous demodulator 66 is an electrical signal of useful amplitude or power level, this signal being a substantially exact representation or analogue of the original input information entering the system at 56.

Figure 4:
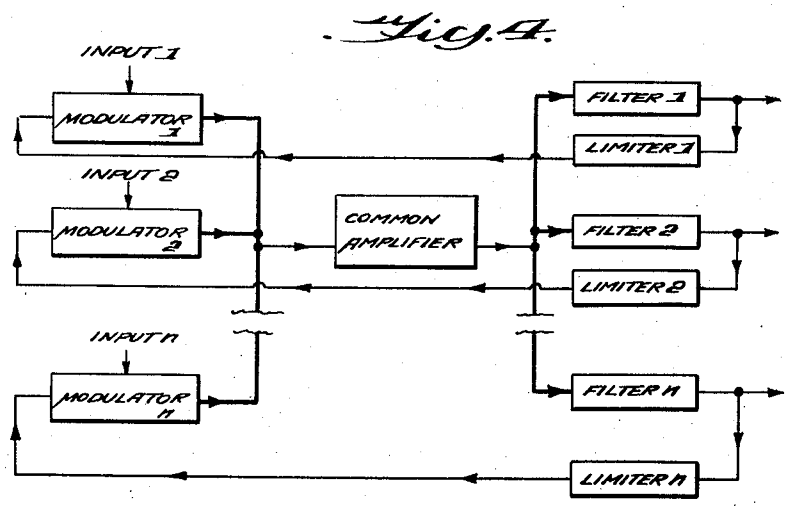
Fig. 4 is a block diagram of a multiplexed embodiment of my improved system. In this embodiment a plurality of amplitude-modulating devices have individually amplified outputs, although only one gain element is employed in the system.

The embodiment of my invention shown in Fig. 4 is achieved by multiplexing "*n*" number of oscillating loops. It will be observed that each loop of the multiplex arrangement is essentially the circuit used in the embodiment shown in Fig. 1. A separate filter (i.e., frequency-selective element) and limiter is used for each loop of the multiplex; but the amplifier (i.e., gain element) is common to all loops. Thus, an intrinsic economy in components is achieved since a plurality of amplitude-modulating devices are provided with carrier excitation, at different frequencies, and a plurality of completely independent amplitude-modulated outputs of useful amplitude or power level are produced through the use of a single and common gain element. In many cases, such as in the circuit shown in Fig. 2, the amplitude-modulating devices, filters, and limiters may be purely passive elements. The only element using power from external sources, i.e., the amplifier, is common to all loops of the multiplex arrangement. Thus, a manifold economy of power consumption is achieved.

The amplifier would have to have sufficient output power to drive the plurality of loads connected to it. However, since the power an amplifier delivers to its load is usually a very small fraction of the total power it consumes, great economy is nevertheless achieved by driving a plurality of loads with one amplifier. In addition, the multiplex arrangement of Fig. 4 effects a tremendous reduction in the number of components required as compared with the number of components required by prior art methods of exciting and obtaining useful outputs from a plurality of independent amplitude-modulating devices.

Figure 5:
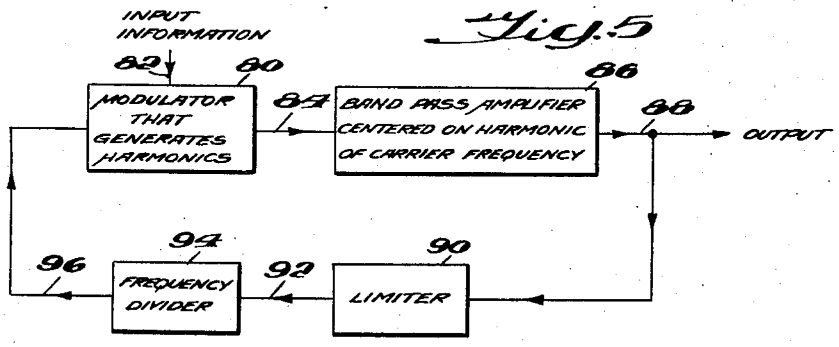
Fig. 5 is a block diagram showing an embodiment of my improved system in which the useful information is conveyed by an amplitude-modulated harmonic of the carrier frequency exciting the amplitude-modulating device.

The embodiment of my invention shown in Fig. 5, employs an amplitude-modulating device 80 whose operation generates harmonics of the exciting carrier frequency, the amplitude of such harmonics being a function of the original input information 82. One example of such an amplitude-modulating device is a vacuum phototube with an alternating or pulsating voltage applied across the electrodes. If this alternating or pulsating voltage is of sufficient amplitude to always produce current saturation, harmonics (principally odd-numbered harmonics) will occur in the current waveform; and, further, the amplitude of any particular harmonic will be accurately proportional to the amount of light incident on the phototube. Referring to Fig. 5, the output 84 of the harmonic-generating modulator 80 goes to a bandpass amplifier 86 tuned to pass only a certain harmonic of the original carrier frequency. The output 88 of this amplifier 86 forms the useful output of the system. This useful output is a waveform whose frequency is a harmonic of the original carrier frequency and whose amplitude conveys the information introduced into the system by the harmonic-generating, amplitude-modulating device 80. The output 88 of the band-pass amplifier 86 goes to the limiter 90; the output of the limiter 92 feeds into a frequency dividing circuit 94. The function of the frequency dividing circuit is to produce an output waveform whose frequency is an integral quotient of the frequency of the input waveform. The system is so arranged that the operation of the frequency dividing circuit restores the original frequency whose harmonic was passed by the tuned amplifier 86. For instance, if the amplitude-modulating device produced a third harmonic of sensible amplitude, the band-pass amplifier would be centered on this third harmonic, and the frequency dividing circuit would perform a 3 to 1 frequency division. The output 96 of the frequency divider 94 provides the carrier excitation for the amplitude-modulating device 80. Thus, a closed loop in a state of self-sustained oscillation is set up. This oscillatory loop is unusual in that there is a change of frequency at different points around the loop. At output 88, the oscillations occur at the frequency of the harmonic; at output 96 the oscillations are at fundamental frequency. Self-sustaining oscillations may exist in such a system if gain and phase-shift relationships analogous to those discussed in connection with Fig. 1 are maintained. The usefulness of the system shown in Fig. 5 lies in the fact that some amplitude-modulating devices generate harmonics in exact proportionality to the input information without extraneous noise, while at the same time there is considerable noise present in the form of spurious modulation of the fundamental carrier frequency; the use of the harmonic to convey the useful information results in a better signal to noise ratio.

The embodiments of my invention discussed herein and shown in Figs. 1, 3, 4 and 5, are capable of considerable rearrangement and combination. For instance, advantage might be gained in certain applications of the system shown in Fig. 1, by placing the frequency-selective element between the amplitude-modulating device and the amplifier. Indeed, the system shown in Fig. 1 will function with advantage no matter how the four components are rearranged, as long as the point where a useful signal is conducted from the system comes after the amplitude-modulating device but ahead of the limiter.

Again, as an example, the synchronous demodulator shown in Fig. 3 might be combined with the system shown in Fig. 4, thus providing means for demodulating a plurality of amplitude-modulated outputs.

In general it should be stated that, although described and claimed in terms of voltages, the systems described and claimed herein are operative in like manner with currents by means which will be apparent to those skilled in the art.

I claim:

1. In an improved system for producing amplitude-modulated signals, the combination comprising a loop that oscillates continuously at a selected carrier frequency independently of any outside signals, said loop provided with an amplitude-modulating device and also with a gain element which serves to amplify the small signals from said amplitude-modulating device to a useful power or voltage level and to insure unity gain around the loop for said selected carrier frequency, said loop also provided with a single frequency-selective element that passes only the aforesaid carrier frequency and all useful sidebands generated within the loop by the aforesaid amplitude-modulating device to eliminate noise frequencies in said signals and to insure zero phase shift around the loop for the carrier frequency, said loop also provided with a limiter, the input of which is an alternating carrier-frequency voltage of varying amplitude and the output of which is an alternating carrier-frequency voltage of constant amplitude, said amplitude-modulating device serving to amplitude modulate said constant amplitude carrier-frequency voltage in accordance with an external source of information that fluctuates only at frequencies lower than said carrier frequency, to produce an alternating carrier-frequency voltage of varying amplitude in said loop at the output of said modulating device, and output means energized by the amplitude-modulated signals existing in said loop at a point intermediate the output of said amplitude-modulating device and the input of said limiter.

2. In an improved system for producing demodulated output signals from an amplitude-modulating device, the combination comprising an oscillating loop provided with a gain element to insure unity gain around said loop for a selected frequency and provided with a single frequency-selective element to insure zero phase shift around the loop for said selected frequency, said oscillating loop also provided with a limiter, the input of which is an alternating voltage of varying amplitude and the output of which is an alternating voltage of constant amplitude, said oscillating loop further provided with a device for amplitude modulating said alternating voltage of constant amplitude in accordance with an external source of information to produce an alternating voltage of varying amplitude in said loop at the output of said modulating device, a synchronous demodulator having a signal voltage input and a reference voltage input which demodulator is positioned outside of said oscillating loop, said demodulator having its signal input energized by said alternating voltage of varying amplitude and its reference voltage input energized by said alternating voltage of constant amplitude.

3. In an improved system for producing demodulated output signals from an amplitude-modulated device, the combination comprising an oscillating loop provided with and serially connected therein, a gain element to insure unity gain around said loop for a selected frequency, a single frequency-selective element to insure zero phase shift around the loop for said selected frequency, a limiter, and a device for amplitude modulating the output of said limiter in accordance with an external source of information, a synchronous demodulator having a signal voltage input and a reference voltage input, which demodulator is positioned outside of said oscillating loop, said demodulator having its signal input energized by the voltage in said oscillating loop existing between said frequency dependent element and said limiter and its reference voltage input energized by the voltage in said oscillating loop existing between said limiter and said amplitude modulating device.

4. In an improved system for producing a plurality of amplitude-modulated signals, the combination comprising a plurality of individual loops, each of which oscillates continuously at a selected carrier frequency independently of any outside signals, the selected carrier frequency of each loop being different from that of each of the other loops, each of said loops provided with an amplitude-modulating device responsive to a different input signal, a single gain element, means to connect said single gain element to amplify all of said different signals from the plurality of amplitude-modulating devices to a useful power or voltage level, said single gain element also serving to insure unity gain around each loop individually for the selected carrier frequency of that particular loop, each individual loop also provided with a single frequency-selective element that passes only the selected carrier frequency and all the useful sidebands generated within the particular loop by the amplitude-modulating device specific to that loop and excludes the carrier frequencies and sidebands of all the other loops, the frequency-selective elements also serving to eliminate noise frequencies from the amplitude-modulated signals in their respective loops and in addition serving to insure zero-phase shift around each individual loop for the selected carrier frequencies of that particular loop, each individual loop also provided with a limiter, the input of which is a voltage of varying amplitude alternating at the selected carrier frequency specific to the particular loop and the output of which is a voltage alternating at the same frequency but of constant amplitude, the amplitude modulating device of each individual loop serving to amplitude modulate the constant-amplitude carrier-frequency voltage in that loop in accordance with the said input signal specific to that loop, said input signal in each individual loop fluctuating only at frequencies lower than the selected carrier frequency of that particular loop to produce an alternating carrier-frequency voltage of varying amplitude at the output of the amplitude-modulating device in that loop, each individual loop also provided with an output means energized by the amplitude-modulated signal existing in that loop at a point intermediate the output of its frequency-selective element and the input of its limiter.

5. In an improved system for producing amplitude-modulating signals, the combination comprising a loop that oscillates continuously under selected frequency conditions and independently of any outside signals, said selected frequency conditions comprising the existence in a portion of said loop of a carrier frequency and the existence in another portion of said loop, of a second frequency bearing a harmonic relationship to said carrier frequency, said loop provided with an amplitude-modulating device that generates harmonics of its exciting carrier frequency in proportion to an external source of information, said loop also provided with a gain element that serves to amplify the small, harmonic-frequency signals from said amplitude-modulating device to a useful power or voltage level and to insure unity gain around the loop for said selected frequency conditions, said loop also provided with a single frequency-selective element that passes only the said harmonic frequency and all useful sidebands or said harmonic frequency that are generated within the loop by the said amplitude-modulating device, said frequency-selective element serving to eliminate noise frequencies in said amplitude-modulated, harmonic-frequency signals and also serving to insure phase shift conditions for the carrier frequency and harmonic frequency that permit continuous spontaneous oscillation of said loop, said loop also provided with a limiter, the input of which is an alternating harmonic-frequency or carrier-frequency voltage of varying amplitude, and the output of which is an alternating voltage with the same frequency as the input voltage but of constant amplitude, said loop further provided with a frequency-dividing means having a ratio of frequency division equal to the ratio between said harmonic frequency and said carrier frequency, said frequency-dividing means connected in said loop to provide carrier-frequency excitation to said amplitude-modulating device, said amplitude-modulating device producing at its output amplitude-modulated harmonics of said exciting carrier frequency in proportion to an external source of information that fluctuates only at frequencies lower than said carrier frequency, said loop further provided with output means energized by the aforesaid amplitude-modulated harmonic-frequency signals.

References Cited in the file of this patent

UNITED STATES PATENTS

| | | |
|---|---|---|
| 1,677,797 | Robinson | July 17, 1928 |
| 2,124,191 | Geiger | July 19, 1938 |
| 2,452,132 | Lange | Oct. 26, 1948 |
| 2,469,803 | Weathers | May 10, 1949 |
| 2,664,545 | Leyton | Dec. 29, 1953 |